(12) United States Patent
Ekman et al.

(10) Patent No.: US 10,344,970 B2
(45) Date of Patent: Jul. 9, 2019

(54) BURNER DEVICE AND METHOD

(71) Applicants: Tomas Ekman, Saltsjö-Boo (SE);
Rudiger Eichler, Täby (SE)

(72) Inventors: Tomas Ekman, Saltsjö-Boo (SE);
Rudiger Eichler, Täby (SE)

(73) Assignee: Linde Aktiengesellschaft, Munich (DE)

( * ) Notice: Subject to any disclaimer, the term of this patent is extended or adjusted under 35 U.S.C. 154(b) by 722 days.

(21) Appl. No.: 15/045,388

(22) Filed: Feb. 17, 2016

(65) Prior Publication Data
US 2016/0298839 A1    Oct. 13, 2016

(30) Foreign Application Priority Data

Apr. 8, 2015    (EP) .................................... 15000995

(51) Int. Cl.
| | |
|---|---|
| F23D 14/22 | (2006.01) |
| F23D 14/26 | (2006.01) |
| F23D 14/60 | (2006.01) |
| F23C 5/06 | (2006.01) |
| F23D 14/24 | (2006.01) |
| F23D 14/32 | (2006.01) |

(52) U.S. Cl.
CPC ................ *F23D 14/22* (2013.01); *F23C 5/06* (2013.01); *F23D 14/24* (2013.01); *F23D 14/26* (2013.01); *F23D 14/32* (2013.01); *F23D 14/60* (2013.01)

(58) Field of Classification Search
CPC . F23C 5/06; F23D 14/24; F23D 14/32; F23D 14/22; F23D 14/26; F23D 14/60
See application file for complete search history.

(56) References Cited

U.S. PATENT DOCUMENTS

| | | | |
|---|---|---|---|
| 1,438,842 | A | 12/1922 | Majot |
| 4,582,479 | A | 4/1986 | Battles |
| 4,797,087 | A | 1/1989 | Gitman |
| 5,199,866 | A | 4/1993 | Joshi et al. |
| 5,217,363 | A | 6/1993 | Brais et al. |
| 5,411,393 | A | 5/1995 | Askin et al. |
| 5,567,141 | A | 10/1996 | Joshi et al. |
| 5,724,901 | A | 3/1998 | Guy et al. |

(Continued)

FOREIGN PATENT DOCUMENTS

| | | |
|---|---|---|
| DE | 10140835 A1 | 3/2003 |
| DE | 10156376 A1 | 6/2003 |

(Continued)

OTHER PUBLICATIONS

European Search Report for EP 15 00 0995, dated Oct. 2, 2015, 8 pages.

*Primary Examiner* — Alfred Basichas
(74) *Attorney, Agent, or Firm* — Joshua L. Cohen

(57) ABSTRACT

A burner device (100) having a longitudinal axis (L), a fuel outlet and an oxidant outlet, includes an inner tube (110) carrying an oxidant to the oxidant outlet in the inner tube, and an outer tube (120) arranged concentrically with the inner tube and carrying a fuel to the fuel outlet in the outer tube. The oxidant outlet includes at least one aperture (112,113) directing the oxidant at a primary oxidant angle (b) of between 45° and 82.5° from the longitudinal axis, and the fuel outlet includes at least one aperture (122,123) directing the fuel at a fuel angle (a) of between 45° and 82.5° from the longitudinal axis, the fuel angle being at least as large as the primary oxidant angle. A related heating method is also provided.

12 Claims, 4 Drawing Sheets

(56) References Cited

U.S. PATENT DOCUMENTS

| | | |
|---|---|---|
| 5,772,421 A | 6/1998 | Besik et al. |
| 6,171,100 B1 | 1/2001 | Joshi et al. |
| 2003/0056439 A1 | 3/2003 | Wilhelm et al. |
| 2008/0096146 A1 | 4/2008 | Li et al. |
| 2009/0325110 A1 | 12/2009 | Mahoney et al. |
| 2013/0175365 A1 | 7/2013 | Ergut et al. |

FOREIGN PATENT DOCUMENTS

| | | |
|---|---|---|
| EP | 2733124 A1 | 5/2014 |
| GB | 2427261 A | 12/2006 |
| WO | WO 2007/048429 A1 | 5/2007 |
| WO | WO 2008/092763 A1 | 8/2008 |
| WO | WO 2012/062776 A1 | 5/2012 |
| WO | WO 2014/076297 A2 | 5/2014 |
| WO | WO2014201106 A1 | 12/2014 |

BURNER DEVICE AND METHOD

BACKGROUND OF THE INVENTION

The present invention relates to a burner device and to a method for heating a furnace space. In particular, the invention relates to burner devices arranged in the ceiling and/or side walls of a heating furnace, and to a heating furnace comprising such burners.

In many industrial combustion applications, it is preferable to use an oxidant with high oxygen contents, so-called oxyfuel combustion. This yields improved heating efficiency and may decrease $NO_x$ formation so long as peak flame temperatures can be controlled.

One general problem of using such high-oxygen oxidant is to achieve adequate peak flame temperature control.

A specific problem in the case of burners arranged in the ceiling or side walls of heating furnaces is that the direct heating power reaching the material in the furnace must be limited in order to avoid overheating of the material.

Previously, it has been proposed to impart a rotational motion of supplied fuel or oxidant, so that centrifugal forces provide for a divergence after exit from the burner. This provides for a plate-shaped flame, which can be arranged to propagate along the ceiling or side wall and as a result be sufficiently removed from the heated material. In another previously known solution, the fuel or oxidant is supplied at an angle from the longitudinal axis of the burner, to provide a similar effect.

It has proved difficult to construct a burner robustly yielding such a controlled, plate-shaped flame due to material degradation caused by the high temperature and aggressive environment inside an industrial furnace. In particular, it is problematic to use high-oxygen oxidants with prior art plate-shaped flame burners while at the same time controlling peak flame temperatures and avoiding material overheating as explained above.

SUMMARY OF THE INVENTION

The present invention solves the above described problems.

Hence, the invention rebates to a burner device having a longitudinal axis and which includes a fuel outlet and a primary oxidant outlet, which burner device further includes an inner circular cylindrical tube, arranged to carry a primary oxidant up to the primary oxidant outlet which is arranged at the end of said inner tube, and an outer circular cylindrical tube, arranged concentrically with and surrounding the inner tube and arranged to carry a fuel up to the fuel outlet which is arranged at the end of said outer tube, wherein the respective longitudinal axes of the inner tube and the outer tube coincide with the longitudinal axis of the burner device, which burner device is characterised in that the primary oxidant outlet is arranged in the form of at least one primary oxidant aperture through an end surface of the inner tube, which primary oxidant aperture is arranged to direct said primary oxidant escaping through the primary oxidant aperture at a primary oxidant angle (b) which is between 45° and 82.5° from the burner device longitudinal axis, in that the fuel outlet is arranged in the form of at least one fuel aperture through an end surface of the outer tube, which fuel aperture is arranged to direct said fuel escaping through the fuel aperture at a fuel angle (a) which is between 45° and 82.5° from the burner device longitudinal axis, and in that the fuel angle is at least as large as the primary oxidant angle.

The invention also relates to a method for heating a furnace space, including the steps a) providing a burner device having a longitudinal axis and including a fuel outlet and a primary oxidant outlet, which burner device further includes an inner circular cylindrical tube, arranged to carry a primary oxidant up to the primary oxidant outlet which is arranged at the end of said inner tube, and an outer circular cylindrical tube, arranged concentrically with and surrounding the inner tube and arranged to carry a fuel up to the fuel outlet which is arranged at the end of said outer tube, wherein the respective longitudinal axes of the inner tube and the outer tube coincide with the longitudinal axis of the burner device, wherein the primary oxidant outlet is arranged in the form of at least one primary oxidant aperture through an end surface of the inner tube, which primary oxidant aperture is arranged to direct said primary oxidant escaping through the primary oxidant aperture at a primary oxidant angle which is between 45° and 82.5° from the burner device longitudinal axis, in that the fuel outlet is arranged in the form of at least one fuel aperture through an end surface of the outer tube, which fuel aperture is arranged to direct said fuel escaping through the fuel aperture at a fuel angle which is between 45° and 82.5° from the burner device longitudinal axis, and in that the fuel angle is at least as large as the primary oxidant angle; b) feeding primary oxidant and fuel to the burner device; c) and varying or controlling the flame geometry, size, location, shape, mean and/or peak temperature by adjusting the relative rotational position of the outer tube in relation to the inner tube, and as a consequence the relative angular position, about the burner device longitudinal axis, of the at least one primary oxidant aperture and the at feast one fuel aperture.

The burner device of the present invention is particularly advantageously applicable in the side walls of bogie hearth furnaces, especially for large ingots of 10 tons or more; and in the ceiling of walking beam or pusher furnaces.

BRIEF DESCRIPTION OF THE DRAWINGS

In the following, the invention will be described in closer detail, partly in connection to the enclosed drawings, in which.

Figures 1, 2:
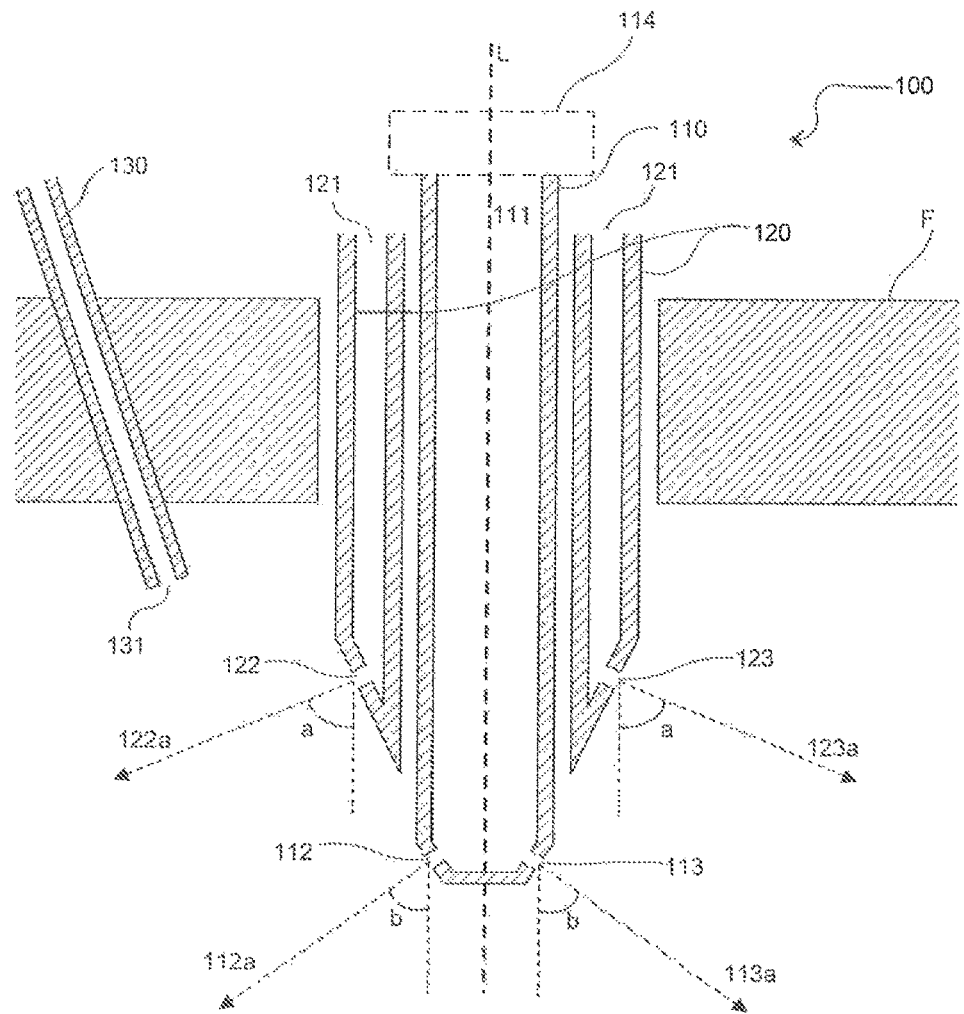
FIG. 1 is a cross-sectional side view of a first burner device according to the present invention.
FIG. 2 is a bottom view of the burner device of FIG. 1.

The figures are generally schematic and not to scale, for reasons of clarity. All figures share the same reference numerals for the same or corresponding features. In particular, the last two digits of corresponding reference numbers are the same across figures, while the first digit denotes the figure number in question.

DETAILED DESCRIPTION OF THE INVENTION

FIG. 1 discloses a burner device 100 according to the invention, having a longitudinal axis L and comprising a fuel outlet and a primary oxidant outlet. The fuel outlet is in the form of apertures 122, 123, through which a liquid or, preferably, gaseous fuel is arranged to flow out from the burner device 100 and into a combustion zone. The primary oxidant outlet is in the form of apertures 112, 113, through which, similarly, a primary oxidant is arranged to flow out from the burner device 100 and into the combustion zone, in which the oxidant mixes with the fuel whereby combustion takes place.

The burner device 100 comprises an inner circular cylindrical tube 110, arranged to carry the primary oxidant through a primary oxidant channel 111, up to the primary oxidant outlet 112, 113, which is arranged at the end of said inner tube 110. The burner device 100 also comprises an outer circular cylindrical tube 120, arranged concentrically with and surrounding the inner tube 110, and arranged to carry the fuel through a fuel channel 121, up to the fuel outlet 122, 123 which is arranged at the end of said outer tube 120.

The respective longitudinal axes of the inner tube 110 and the outer tube 120 coincide with the longitudinal axis L of the burner device 100 itself. Hence, the fuel and the primary oxidant are supplied through concentric tubes 110, 120, that are preferably circular symmetric with the exception of the apertures 112, 113, 122, 123.

In FIG. 1, there are several primary oxidant outlet apertures 112, 113. According to the invention, the primary oxidant outlet is arranged in the form of at least one such primary oxidant aperture 112, 113 through an end surface of the inner tube 110, which primary oxidant aperture is arranged to direct the primary oxidant 112a, 113a escaping through the said at least one primary oxidant aperture(s) 112, 113 at a primary oxidant angle b which is between 45° and 82.5° from the burner device 100 longitudinal axis L. In other words, the primary oxidant is released at an angle which is between 7.5° and 45° from the horizontal in FIG. 1. The primary oxidant angle b is preferably determined by the geometry of the cylinder 110, rather than an imparted rotational momentum of the primary oxidant, or the like.

In a similar way, according to the invention the fuel outlet is arranged in the form of at least one fuel aperture 122, 123 (even though there are several such apertures in FIG. 1, the number of such apertures may be only one, as is the case with the primary oxidant apertures), through an end surface of the said outer tube 120, which at least one fuel aperture 122, 123 is arranged to direct the said fuel 122a, 123a escaping through the fuel aperture 122, 123 at a fuel angle a which is between 45° and 82.5° from the burner device 100 longitudinal axis L. In other words, the fuel is released at an angle from the horizontal in FIG. 1 of between 7.5° and 45°. For both the primary oxidant and the fuel, this means, since the horizontal in FIG. 1 coincides with the surface plane of a wall or ceiling F of the furnace in which the burner device 100 is installed, that both the primary oxidant and the fuel are released at an angle of between 7.5° and 45° in relation to the interior ceiling or side wall surface of the furnace in which the burner device 100 is installed to heat the interior of the furnace.

According to an important aspect of the invention, the fuel angle a, from the burner device 100 longitudinal axis, is at least as large as, and preferably larger than, preferably at least 5° larger than, the primary oxidant angle b. In other words, the fuel and the primary oxidant are released at parallel or, preferably, diverging angles.

Such a burner device 100 accomplishes, with suitable selection of primary oxidant and fuel quality, as well as suitable release velocity of the primary oxidant 122a, 123a and fuel 112a, 113a, that a larger share of oxygen can be used in the primary oxidant while still being able to control peak flame temperatures and heated material surface overheating to acceptable levels, in turn providing efficient, low-$NO_x$ heating as described above.

In particular, it is preferred that the primary oxidant contains more oxygen than air, preferably at least 85% oxygen by weight, preferably at least 95% oxygen by weight, most preferably industrially pure oxygen.

It is further preferred that the primary oxidant is released at an overpressure of at least 2 bars, preferably at least 5 bars, preferably above 10 bars, resulting in a release 112a, 113a velocity of preferably at least sonic velocity (Mach 1), more preferably at least Mach 1.3, most preferably about Mach 1.5 or above. In particular, it is preferred to use diverging release angles a, b (a−b>0°) in combination with high oxidant purities (at least 85% oxygen by weight) and high release 112a, 113a velocities (at least Mach 1).

The fuel is preferably injected 122a, 122b at a lower velocity than the primary oxidant, preferably only using the available fuel supply line pressure, such as an over-pressure of between 50 and 500 mbar, of the fuel delivery equipment used.

Using such a burner device 100, a so-called flameless combustion (combustion without a visible flame and/or with a highly dispersed combustion zone, with large quantities of entrained combustion products) is possible to achieve, resulting in controlled peak flame temperatures. Such flameless combustion can be achieved well above the self-ignition temperature of the combustible mix. Also, it is possible to control the location of the combustion zone close to or even substantially along the interior ceiling or side wall F of the furnace, keeping the peak flame temperature at safe distance from the surface of a material to be heated in the furnace.

As a result, oxyfuel burners providing flameless combustion can be used in the side wall or ceiling of a furnace for heating a piece of material, resulting in higher heating efficiency and power, without risking material damage or elevated $NO_x$ levels.

Furthermore, the burner device 100 construction proposed herein can be made robust and resistant to the aggressive environment within the furnace heated space, with only a limited number of movable parts while still providing adjustability. Preferably, the parts of the burner device 100 being in contact with the furnace atmosphere are made from ceramic material or high temperature resistant steel, and are cooled using the flowing fuel and oxidant, respectively.

By varying the oxidant oxygen contents and release velocity; number of apertures and their diameters; the angles a, b; and/or the relative rotation of the tubes 110, 120 (see below), a wide variety of fuels may be used. However, it is preferred that the fuel is a gaseous fuel, such as natural gas.

Also, as compared to using high velocity lancing of oxidant along the furnace ceiling, from the side wall of the furnace, the present burner device 100 provides more even heating across the heated material.

The heated material is preferably a metal material, such as a steel slab or ingot. In particular, it is preferred to use one or several burner devices 100 according to the invention in the soaking zone of a heating furnace, since an increased heating efficiency is valuable there due to the fact that the temperature is inherently highest in this part of the heating furnace. According to one preferred embodiment, one, or preferably several, existing, conventional burners arranged in the ceiling of such a soaking are replaced by corresponding burner devices 100 according to the invention.

It is preferred that the outer tube 120 is a double-walled tube, wherein the fuel is carried in the space 121 between the walls of the double-wall structure.

Figure 3A:
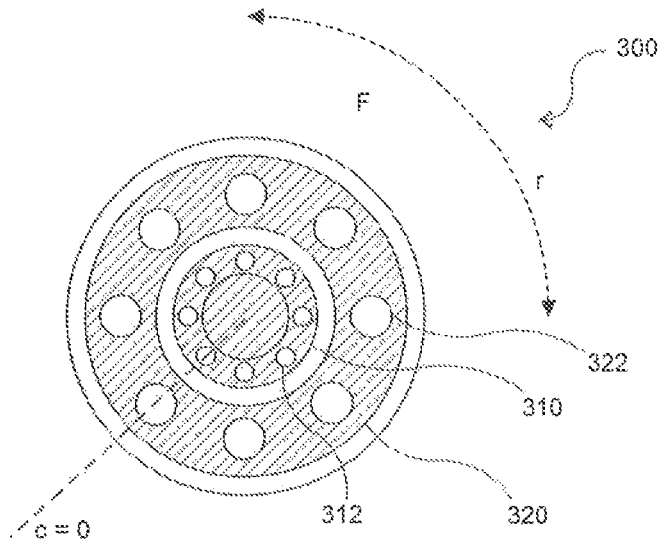
FIG. 3*a* is a bottom view of a second burner device according to the invention in a first rotational state.
Figure 3B:
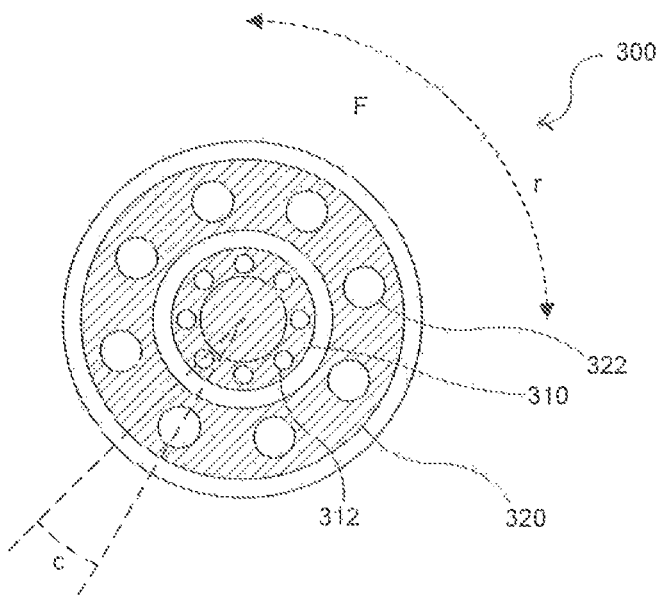
FIG. 3*b* is a bottom view of the second burner device in a second rotational state.

FIG. 1 further shows a pilot burner 130 with an opening 131, which is conventional as such. As illustrated in FIGS. 2 and 3a-3b, the pilot burner 130 needs not be used.

In all figures, the distances between separate tubes are exaggerated. However, in general no sealing is necessary between adjacent tubes, which is an advantage provided by the present invention.

Figure 4:
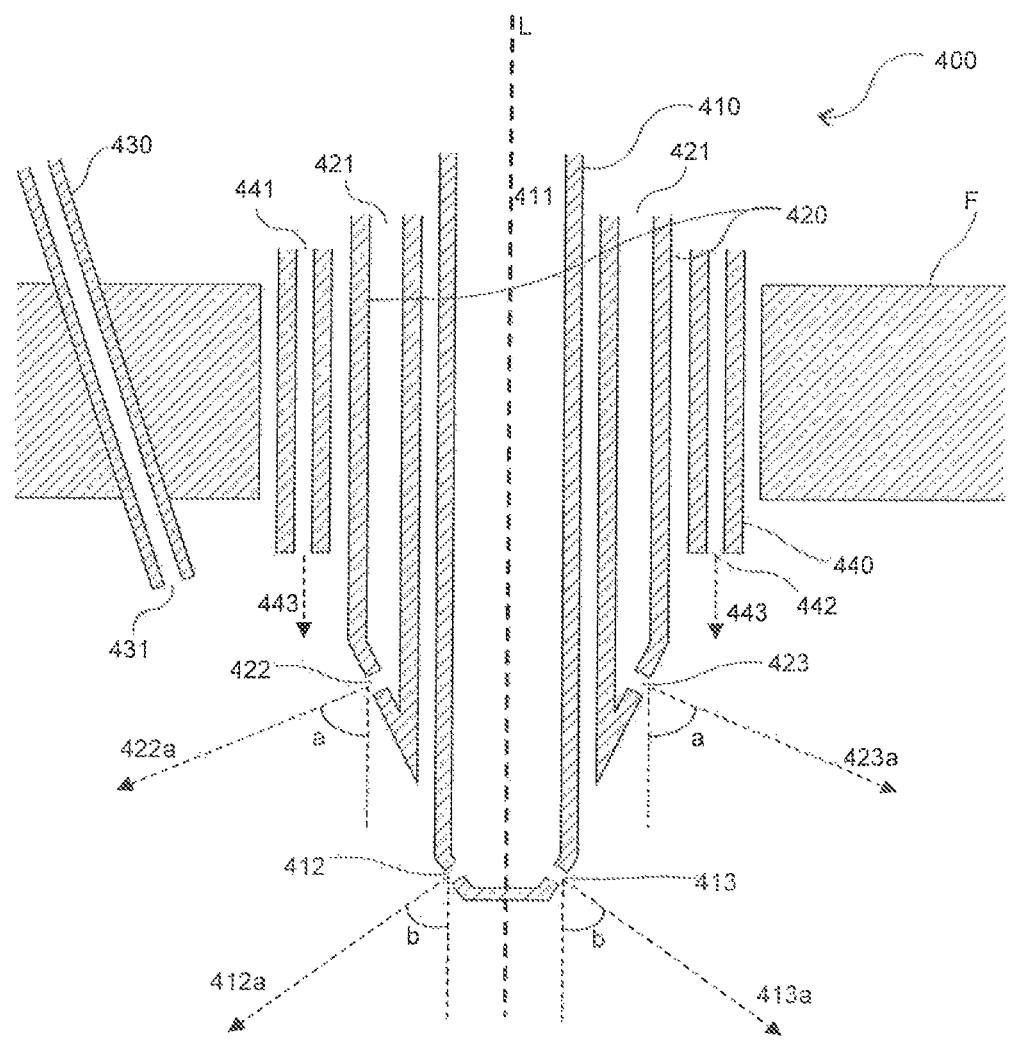
FIG. 4 is a cross-sectional side view of a third burner device according to the invention.

According to a preferred embodiment, illustrated in FIG. 4, the burner device 400 further comprises a third circular cylindrical tube 440, arranged concentrically with and surrounding the outer tube 420. This third tube 440 is arranged to carry a secondary oxidant, through a secondary oxidant channel 441, up to a secondary oxidant outlet 442, arranged in an end surface of the third tube 440. The secondary oxidant outlet is arranged to direct the secondary oxidant 443 escaping through the secondary oxidant outlet 442 at a secondary oxidant angle, in relation to the burner device 400 longitudinal axis L, which is less than the fuel angle. In FIG. 4, the secondary oxidant angle is substantially 0°, which is preferred. In other words, the secondary oxidant is released 443 substantially in parallel to the longitudinal axis L.

The third tube 440 may also be single-walled, as opposed to the one illustrated in FIG. 4, wherein the secondary oxidant is led in a space between an inner wall of said single-walled tube and an inner wall of the outer tube 420.

The secondary oxidant is preferably released 443 at a velocity which is below that of the primary oxidant 412a, 413a, preferably below sonic velocity, preferably about Mach 0.5. The secondary oxidant may be air, but is preferably a high-oxygen oxidant, preferably having at least 85% oxygen by weight. According to one preferred embodiment, the primary and secondary oxidants have identical composition.

Such a secondary oxidant tube 440 provides a way to operate the burner device 100 in conventional (visible) flame mode, and in particular to vary the use of the primary and secondary oxidants to allow the burner device 100 to operate across a spectrum of different modes, from completely flameless (all or substantially all oxidant provided as primary oxidant), up to conventional flame mode (all or substantially all oxidant provided as secondary oxidant). According to one preferred embodiment, the mode of operation in terms of distribution of total oxidant between primary and secondary oxidant is varied over one single heating operation, for instance by providing visible flame heating during an initial heating phase, followed by pure flameless heating during a subsequent holding phase, when a surface of a heated material is hotter. The secondary oxidant flow can also be used during ignition of the burner device 100, in order to guarantee contact between oxidant and fuel.

According to one preferred embodiment, the third tube 440 comprises blocking means (not illustrated in FIG. 4) at the outlet 442, arranged to direct the secondary oxidant away from zones into which no fuel is supplied through the apertures 422, 423. For instance, when the apertures 422, 423 are arranged as illustrated in FIG. 2 (four apertures 222-225) or FIG. 3a (eight apertures 322), a corresponding pattern of angularly distributed blocking means would be arranged in the outlet 442, stopping the secondary oxidant from flowing out downwards at angular sections corresponding to the angular sections shown in FIG. 2 or 3a that are not occupied by fuel apertures 222-225; 322. Such an arrangement is particularly useful during ignition of the burner.

FIGS. 2-3b show bottom views of burner devices 200, 300 according to the invention, hence as viewed from below in the view shown in FIGS. 1 and 4. As illustrated, there may be different numbers of primary oxidant apertures 212, 213, 214, 215 (four apertures); 312 (eight apertures). Similarly, there may be different numbers of fuel holes 222, 223, 224, 225 (eight apertures); 322 (eight apertures). Preferably, the number of primary oxidant and fuel apertures, respectively, are the same, so that they can be angularly aligned.

In FIGS. 2-3b, the apertures are illustrated as round holes. However, it is realized that they may also be arranged as elongated slits, as long as a aperture is not arranged as an endless slit running all along the full circumference of the tube 210, 220; 310, 320 in question. Hence, only certain angular sections of each tube 210, 220; 310, 320 end is occupied by the at least one apertures 212-215, 222-225; 312, 322.

According to a preferred embodiment, the inner tube 210, 310 and the outer tube 220, 320 are arranged to be turnable in relation to each other about the burner device 200, 300 longitudinal axis L, along an angular direction r (see FIGS. 2-3b). According to another preferred embodiment, the inner tube 210, 310 and the outer tube 220, 320 are arranged to be displaceable in relation to each other along the burner device 200, 300 longitudinal axis L. The burner device 200, 300 may very well display both such turnability and such displaceability. In FIG. 1, a motor device 114, such as comprising one or two electrical motors, is used to impart these rotational and/or displacing motions, before or during heating operation, it is also possible that the rotation and/or displacement may be manually achieved before heating operation commences, or even during heating operation. Either the inner tube 110 or the outer tube 120 may be rotated, or both. It is preferred that it is the inner tube 110 which is rotated, and that the outer tube 120 is fixed. The displaceability can also advantageously be provided such that it is possible to completely retract the tubes 110, 120 of the burner device 100 into the ceiling or wall F, which may be preferred in certain applications when the burner device 100 is not used.

The motor device 114 may be arranged to control the relative rotation and/or displacement to a particular value upon command from a user interface (not shown) or according to a predetermined operation program; or to automatically rotate or rotationally oscillate the tubes 110, 120, one in relation to the other, during heating operation. The latter will improve temperature evenness in the furnace.

Irrespectively of any relative displaceability of the tubes, it is preferred that a minimum distance between the primary oxidant apertures 112, 113 and the fuel apertures 122, 123 of 20 mm, along the burner device 100 longitudinal axis L, is kept during heating operation, in order to separate the streams of primary oxidant and fuel.

According to one preferred embodiment, the at least one primary oxidant aperture 212-215; 312 and the at least one fuel aperture 222-225; 322 are angularly displaced in relation to each other, in the angular direction r about the burner device 200, 300 longitudinal axis L, so that they are not angularly aligned one to the other along one and the same radial plane out from the axis L. This is illustrated in FIG. 2. In FIG. 3a, the apertures are angularly aligned, but in FIG. 3b (showing the same burner device 300 as in FIG. 3a but in a different state), the tubes 310, 320 have been rotated in relation to each other so that the apertures are no longer angularly aligned.

According to a further preferred embodiment, as shown in FIGS. 2-3b, there are several equidistantly arranged (in the angular direction r about the burner device 200, 300 longitudinal axis L) primary oxidant apertures 212-215; 312 and/or several equidistantly arranged (in the angular direction r) fuel apertures 222-225; 322. In FIG. 2, there is 90° between each aperture; in FIGS. 3a and 3b, there is 45° between each aperture.

In particular, there are preferably between 3 and 10 separate primary oxidant apertures 212-215; 312 and between 3 and 10 separate fuel apertures 222-225; 322.

By varying the relative angle c between the primary oxidant apertures 212-215; 312 and fuel apertures 222-225; 322 by rotating the tubes 110, 120 in relation to each other, the divergence of the primary oxidant and fuel streams 112a, 113a, 122a, 123a can be varied, and hence the size, location, distribution and temperature of the combustion zone. By varying the relative longitudinal distance between the apertures 212-215; 312; 222-225; 322, by displacing the tubes 110, 120 in relation to each other, a similar effect can be achieved.

According to one preferred embodiment, for an individual burner device 100 the angle c between angularly adjacent primary oxidant- and fuel apertures is at least 10°.

Figure 5:
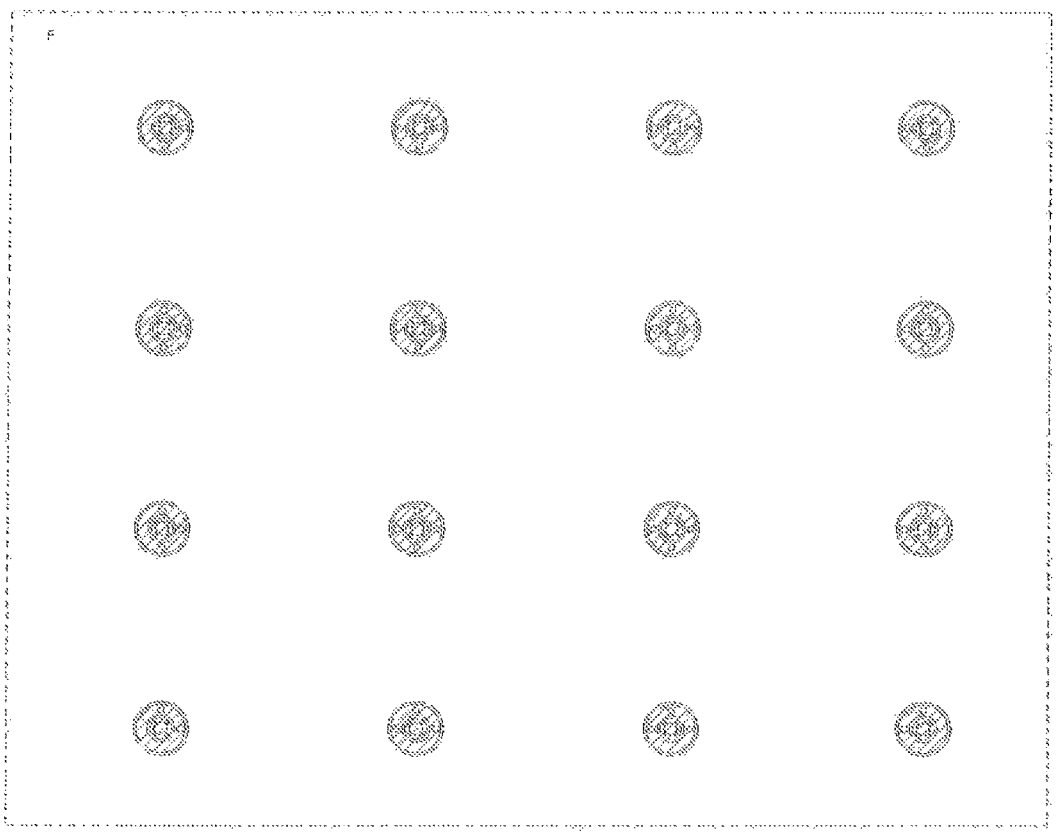
FIG. 5 is a bottom view of an array of burner devices in a ceiling of a furnace according to the invention.

However, in an alternative embodiment, as illustrated in FIG. 5, there are several burner devices 100 cooperating to provide a connected combustion zone, in which case for each individual burner the corresponding angle c is preferably larger than 10°. In general, in the case with several cooperating burner devices, it is preferred that at least most of all primary oxidant apertures in such burner devices are located at an angle c about the respective burner device 100 longitudinal axis L of at least 10° from any neighbouring fuel aperture arranged in the same burner device.

This latter is illustrated in FIG. 5, which is a view from below of 16 individual burner devices arranged in a 4×4 matrix pattern in the ceiling or side wall F of a furnace, where all angles c are set to 22.5°.

As can be seen in FIG. 5, the fuel apertures that are arranged to propel fuel jets in directions outwards from the matrix are missing, or have been plugged, so that all fuel is directed to locations within the matrix. This provides a well-defined heated area with a very diffuse flame picture. Alternatively, the corresponding externally directed primary oxidant apertures can be omitted, or both the externally directed fuel and primary oxidant apertures can be omitted. By using an oscillatory rotational motion rather than a fully rotational motion (as described above), it is possible to vary the angle c without orienting any apertures so that fuel and/or primary oxidant is propelled outside of the 4×4 matrix. If is realized that any sized and shaped matrix or non-matrix pattern of individual burner devices 100 can be arranged, depending on the particular prerequisites.

Figure 6:
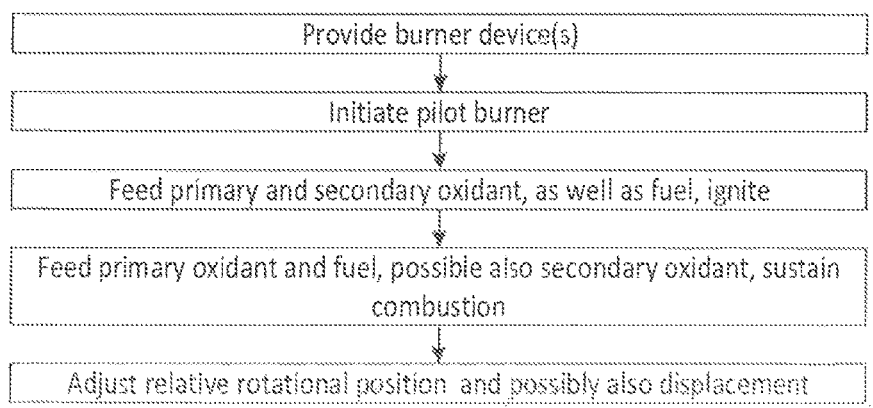
FIG. 6 is a flowchart showing a method according to the present invention.

FIG. 6 illustrates a method according to the present invention, in which an individual burner device 100, or a set of cooperating burner devices 100 such as the one illustrated in FIG. 5, is or are used in order to heat a furnace space.

In a first method step, one or several burner devices 100, 200, 300, 400 is or are provided in accordance with what has been described above, and are installed in the ceiling or side wall F of an industrial furnace.

In an optional second method step, the pilot burner 130 is initiated.

In an optional third method step, secondary oxidant is fed to the burner device(s) 100, in addition to primary oxidant and fuel, as described above, and the (or each) burner device(s) is or are ignited.

In a fourth method step, primary oxidant and fuel are fed to the burner device(s) 100, as described above, optionally in combination with secondary oxidant, in order to sustain combustion in a combustion zone, which in case of several cooperating burner devices 100 preferably is connected. If the third step was not performed, ignition is performed in this fourth step.

In a fifth method step, the flame geometry, size, location, shape, mean and/or peak temperature is varied or controlled by adjusting the relative rotational position of the outer tube 120 in relation to the inner tube 110, as described above, and as a consequence the relative angular position c, about the burner device 100 longitudinal axis L, of the at least one primary oxidant aperture 112, 113 and the at least one fuel aperture 122, 123. In this fifth method step, the longitudinal L distance between the apertures 112, 113; 122, 123 may also be varied, as explained above.

In particular, it is preferred that the combustion power directed to the heated material in the furnace is decreased temporarily or permanently, the latter preferably when going from an initial heating phase to a subsequent holding phase, by either increasing the angle c while keeping the flow of primary oxidant and fuel constant (by making the flame more diffuse), or by decreasing the flow of primary oxidant and fuel while at the same time decreasing the angle c (in order to maintain the diffuseness of the flame at the lower volume flows).

Above, preferred embodiments have been described. However, it is apparent to the skilled person that many modifications can be made to the described embodiments without departing from the basic idea of the invention.

In general, all embodiments described above are combinable, as applicable. For instance, the pilot burner 130 may be used with any version of the burner device, and all such versions may be used in isolation or in combination, for instance as illustrated in FIG. 5.

Furthermore, the number of apertures may be other than 4 or 8. The burner devices may also comprise more details than the ones illustrated in the figures.

It is realized that there are many more possible combinations between the various embodiments described above that are thinkable for particular applications.

Hence, the invention is not limited to the described embodiments, but can be varied across the full scope of the enclosed claims.

What is claimed is:

1. A burner device (100;200;300;400) having a longitudinal axis (L), comprising:
   a fuel outlet and a primary oxidant outlet;
   an inner circular cylindrical tube (110;210;310;410) arranged to carry a primary oxidant to the primary oxidant outlet which is arranged at the end of said inner tube;
   an outer circular cylindrical tube (120;220;320;420) arranged concentrically with and surrounding the inner tube and arranged to carry a fuel to the fuel outlet which is arranged at the end of said outer tube, wherein the inner tube (110;210;310;410) and the outer tube (120: 220;320;420) are turnable in relation to each other, and are displaceable in relation to each other along a longitudinal axis (L) of the burner device, and wherein respective longitudinal axes of the inner tube and the outer tube coincide with the longitudinal axis (L) of the burner device;
   the primary oxidant outlet arranged with at least one primary oxidant aperture (112,113;212,213,214,215; 312;412,413) through an end surface of the inner tube, the primary oxidant aperture arranged to direct said primary oxidant escaping through the primary oxidant aperture at a primary oxidant angle (b) between 45° and 82.5° from the burner device longitudinal axis;

the fuel outlet arranged with at least one fuel aperture (122,123;222,223,224,225;322;422,423) through an end surface of the outer tube, the fuel aperture arranged to direct said fuel escaping through the fuel aperture at a fuel angle (a) which is between 45° and 82.5° from the burner device longitudinal axis, the fuel angle being at least as large as the primary oxidant angle.

2. The burner device (100;200;300;400) according to claim 1, wherein the fuel angle (a) is larger than the primary oxidant angle (b).

3. The burner device (400) according to claim 1, further comprising a third circular cylindrical tube (440) arranged concentrically with and surrounding the outer tube (420), said third tube arranged to carry a secondary oxidant to a secondary oxidant outlet (442) arranged in an end surface of the third tube, the secondary oxidant outlet arranged to direct secondary oxidant escaping through the secondary oxidant outlet at a secondary oxidant angle (b) in relation to the burner device longitudinal axis (L) which is less than the fuel angle (a).

4. The burner device (400) according to claim 3, wherein the secondary oxidant angle (b) is substantially 0°.

5. The burner device (100;200;300;400) according to claim 1, further comprising an electrical motor device (114) arranged to impart at least one of turning and displacement of the inner tube (110;210;310;410) in relation to the outer tube (120;220;320;420).

6. The burner device (100;200;300;400) according to claim 1 wherein the at least one primary oxidant aperture (112,113;212,213,214,215;312;412,413) and the at least one fuel aperture (122,123;222,223,224,225;322;422,423) are angularly displaced in relation to each other in an angular direction (c) about the burner device longitudinal axis (L).

7. The burner device (100;200;300;400), according to claim 1 wherein at least one group of a plurality of the primary oxidant apertures (112, 113;212,213,214,215;312; 412,413) and a plurality of the fuel apertures (122,123;222, 223,224,225;322;422,423) are arranged equidistantly in an angular direction (r) about the burner device longitudinal axis (L).

8. The burner device (100;200;300;400) according to claim 7, comprising from 3 to 10 separate primary oxidant apertures (112, 113;212,213,214,215;312;412,413) and between from 3 to 10 separate fuel apertures (122,123;222, 223,224,225;322;422,423).

9. The burner device (100;200;300;400) according to claim 1, wherein the burner device is arranged to supply the primary oxidant at a velocity of at least sonic velocity.

10. The burner device (100;200;300;400) according to claim 1, wherein the primary oxidant apertures (112,113; 212,213,214,215;312;412,413) are separated from the fuel apertures (122,123;222,223,224,225;322;422,423) along the burner device longitudinal axis (L) by a distance of at least 20 mm.

11. The burner device (100;200;300;400) according to claim 1, wherein the outer tube (120;220;320;420) comprises a double-walled tube for the fuel carried between walls of double-wall structure of said tube.

12. A furnace, comprising a plurality of the burner device (100;200;300;400) according to claim 1, wherein at least a majority of the primary oxidant apertures (112,113;212,213, 214,215;312;412,413) are located at an angle (c) about the respective burner device longitudinal axis (L) of at least 10° from any neighbouring fuel aperture (122,123;222,223,224, 225;322;422,423) arranged in the same one of the plurality of the burner device.

\* \* \* \* \*